United States Patent
Sakaguchi et al.

(10) Patent No.: US 8,217,106 B2
(45) Date of Patent: Jul. 10, 2012

(54) OPTICAL DIFFUSIBLE MATERIAL

(75) Inventors: Mikio Sakaguchi, Wakayama (JP);
Kazuo Oki, Wakayama (JP)

(73) Assignee: Kao Corporation, Tokyo (JP)

( * ) Notice: Subject to any disclaimer, the term of this patent is extended or adjusted under 35 U.S.C. 154(b) by 651 days.

(21) Appl. No.: 11/989,772

(22) PCT Filed: Aug. 2, 2006

(86) PCT No.: PCT/JP2006/315694
§ 371 (c)(1),
(2), (4) Date: Apr. 30, 2008

(87) PCT Pub. No.: WO2007/015576
PCT Pub. Date: Feb. 8, 2007

(65) Prior Publication Data
US 2010/0240520 A1    Sep. 23, 2010

(30) Foreign Application Priority Data

Aug. 3, 2005  (JP) ................................. 2005-224840
Apr. 13, 2006  (JP) ................................. 2006-110393

(51) Int. Cl.
| | |
|---|---|
| C08K 3/18 | (2006.01) |
| C08K 3/22 | (2006.01) |
| B60C 1/00 | (2006.01) |
| C08K 3/40 | (2006.01) |
| C01B 33/20 | (2006.01) |
| C01B 33/26 | (2006.01) |
| C03C 3/083 | (2006.01) |
| C03C 3/085 | (2006.01) |
| C04B 35/00 | (2006.01) |

(52) U.S. Cl. ..... 524/430; 524/494; 423/326; 423/327.1; 501/68; 501/69; 501/153

(58) Field of Classification Search ....... 423/326–330.1; 501/68, 69, 153; 524/430, 494
See application file for complete search history.

(56) References Cited

U.S. PATENT DOCUMENTS

| | | | | |
|---|---|---|---|---|
| 2,963,378 | A * | 12/1960 | Palmquist et al. | 106/1.25 |
| 3,228,897 | A * | 1/1966 | Nellessen | 106/1.25 |
| 3,410,185 | A * | 11/1968 | Harrington | 404/77 |
| 4,418,024 | A * | 11/1983 | Prochazka et al. | 264/1.21 |
| 4,764,486 | A * | 8/1988 | Ishihara et al. | 501/9 |

(Continued)

FOREIGN PATENT DOCUMENTS

CN    1453596 A    11/2003

(Continued)

OTHER PUBLICATIONS

Machine language translation of JP 11-194204, 1999.*

(Continued)

*Primary Examiner* — Katarzyna Wyrozebski Lee
*Assistant Examiner* — Anthony H Sheh
(74) *Attorney, Agent, or Firm* — Birch, Stewart, Kolasch & Birch, LLP (57) ABSTRACT

In the present invention, ceramic particles are used as an optical diffusible filler. The present invention provides an optical diffusible material containing ceramic particles, wherein the ceramic particles satisfy the following requirements (I) and (II): (I) the total amount of $Al_2O_3$ or MgO and $SiO_2$ is 80% by weight or more; and (II) the weight ratio of $Al_2O_3$ or MgO to $SiO_2$ (($Al_2O_3$ or MgO)/$SiO_2$) is 0.1 to 15.

16 Claims, 1 Drawing Sheet

U.S. PATENT DOCUMENTS

| | | | |
|---|---|---|---|
| 5,298,234 A * | 3/1994 | Nakazawa et al. | 423/714 |
| 6,245,700 B1 * | 6/2001 | Budd et al. | 501/34 |
| 6,511,739 B2 * | 1/2003 | Kasai et al. | 428/325 |
| 2001/0030811 A1 * | 10/2001 | Kasai et al. | 359/586 |
| 2003/0185739 A1 * | 10/2003 | Mangold et al. | 423/335 |
| 2004/0146706 A1 | 7/2004 | Kasai et al. | |
| 2005/0135118 A1 | 6/2005 | Takata | |
| 2006/0005937 A1 * | 1/2006 | Sakaguchi et al. | 164/15 |
| 2009/0301345 A1 * | 12/2009 | Mangold et al. | 106/31.13 |

FOREIGN PATENT DOCUMENTS

| | | |
|---|---|---|
| CN | 1539878 A | 10/2004 |
| JP | 61-36354 A | 2/1986 |
| JP | 1-108501 A | 4/1989 |
| JP | 5-286779 A | 11/1993 |
| JP | 7-48118 A | 2/1995 |
| JP | 7-234304 A | 9/1995 |
| JP | 11-132421 A | 5/1999 |
| JP | 11-194204 * | 7/1999 |
| JP | 11-194204 A | 7/1999 |
| JP | 2000-205523 A | 7/2000 |
| JP | 2000-346318 A | 12/2000 |
| JP | 2001-188109 A | 7/2001 |
| JP | 2003-12933 A | 1/2003 |
| JP | 2004-315344 A | 11/2004 |
| JP | 2005-202361 A | 7/2005 |
| WO | WO-01/07375 | 2/2001 |
| WO | WO 2004052572 A1 * | 6/2004 |

OTHER PUBLICATIONS

Encylopedia of Polymer Science and Technology: Polycarbonates, 2006.*

Supplementary European Search Report issued on Dec. 14, 2009 in corresponding European Patent Application No. 06768433.2.

* cited by examiner

Fig. 1

OPTICAL DIFFUSIBLE MATERIAL

FIELD OF THE INVENTION

The present invention relates to an optical diffusible material containing specific ceramic particles.

BACKGROUND OF THE INVENTION

An optical diffusible material is used in an optical product such as a lighting cover, an illuminated sign, a transmissive display or a liquid crystal display in order to utilize it effectively by regulating the scattering and transmission of a light from a light source. Basic properties (optical diffusible ability and total transparency) of the optical diffusible material are regulated by adding a filler having optical diffusibility (also referred to hereafter as "optical diffusible filler") to a transparent base material such as glass, plastic or resin.

Conventionally, inorganic or organic particles have been used as the optical diffusible filler. It is said that the inorganic optical diffusible filler is characterized by being excellent in light resistance and chemical resistance as compared with the organic filler, and silica, alumina, calcium carbonate, barium sulfate, titanium oxide, aluminum hydroxide, glass, talc, mica etc are used (for example, JP-A 2001-188109).

SUMMARY OF THE INVENTION

The present invention provides, as the first embodiment, an optical diffusible material having a total transparency of 70% or more and an optical diffusible ability of 50% or more, containing ceramic particles contained in a base material, the ceramic particles satisfying the following requirements (I) and (II):

(I) the total amount of ($Al_2O_3$ or MgO) and $SiO_2$ is 80% by weight or more; and (II) the weight ratio of ($Al_2O_3$ or MgO) to $SiO_2$ (($Al_2O_3$ or MgO)/$SiO_2$) is 0.1 to 15.

The present invention also provides, as the second embodiment, an optical diffusible material having a total transparency of 70% or more and an optical diffusible ability of 50% or more, containing ceramic particles contained in a base material, the ceramic particles being obtained by fusing, in a flame, powder particles satisfying the following requirements (III) and (IV):

(III) the total amount of ($Al_2O_3$ or MgO) and $SiO_2$ is 80% by weight or more; and (IV) the weight ratio of ($Al_2O_3$ or MgO) to $SiO_2$ (($Al_2O_3$ or MgO)/$SiO_2$) is 0.1 to 17.

DETAILED DESCRIPTION OF THE INVENTION

The present invention provides an optical diffusible material excellent not only in light transmission and light resistance but also in optical diffusibility by using ceramic particles having a specific structure as an optical diffusible filler.

In the related art, an optical diffusible material using the conventional inorganic optical diffusible filler exhibits high transmittance and light resistance, but has a disadvantage of insufficient optical diffusibility.

The present invention provides an optical diffusible material excellent not only in light transmission and light resistance but also in optical diffusibility by using a specific inorganic optical diffusible filler, as well as a method of producing the same.

The production method is preferably a method of producing the optical diffusible material by any of the following methods (a) to (d):

(a) a method of kneading ceramic particles into a base material with a kneader;

(b) a method of mixing ceramic particles in a solution, emulsion, dispersion or suspension of a base-material resin and forming the mixture into a sheet;

(c) a method of coating the surface of a base-material sheet with binder-containing ceramic particles; and (d) a method of adding ceramic particles to monomers of a base-material resin and polymerizing the monomers, in a step of synthesizing a base-material resin.

The present inventors found that ceramic particles having a specific composition are excellent in optical diffusibility, light transmittance (transparency) and light resistance as well as heat resistance and chemical resistance, and they added the ceramic particles to a predetermined base material, thereby arriving at completion of the optical diffusible materials according to the first and second embodiments described below.

In the present invention, the ceramic particles are contained in a base material. The present invention includes allowing the ceramic particles to be contained in the inside of a base material and the ceramic particles to be contained in the surface of a base material.

Further, the present invention provides use of the ceramic particles in production of an optical diffusible material having a total transparency of 70% or more and an optical diffusible ability of 50% or more.

[1] First Embodiment

The first embodiment is an optical diffusible material having a total transparency of 70% or more and an optical diffusible ability of 50% or more, having ceramic particles contained in a base material, wherein the ceramic particles satisfy the following requirements (I) and (II):

(I) the total amount of $Al_2O_3$ or MgO and $SiO_2$ is 80% by weight or more; and (II) the weight ratio of $Al_2O_3$ or MgO to $SiO_2$ (($Al_2O_3$ or MgO)/$SiO_2$) is 0.1 to 15.

Requirement (I)

In the requirement (I), $Al_2O_3$ or MgO and $SiO_2$ are contained in the component, and MgO is preferably contained in the component, from the viewpoint of securing preferred optical diffusibility and light transmittance.

In the requirement (I), also from the same viewpoint, the proportion of $Al_2O_3$ and $SiO_2$ contained or the proportion of MgO and $SiO_2$ contained is 80% by weight or more, preferably 90% by weight or more, even more preferably 95% by weight or more, even more preferably 100% by weight.

Components (also referred to hereinafter as auxiliary components) other than the component composed of $Al_2O_3$ or MgO and $SiO_2$ in the ceramic particles used in the present invention include, for example, metal oxides such as CaO, $Fe_2O_3$, $TiO_2$, $K_2O$, $Na_2O$, $ZrO_2$ etc. and carbon. When $Al_2O_3$—$SiO_2$ is a main component, MgO may be contained as an auxiliary component, while when MgO—$SiO_2$ is a main component, $Al_2O_3$ may be contained as an auxiliary component.

For conferring excellent optical diffusibility and light transmittance on the optical diffusible material, the whiteness of the ceramic particles is preferably higher, and from such viewpoint, the total amount of the auxiliary components in the ceramic particles is 20% by weight or less, preferably 10% by weight or less, more preferably 5% by weight or less. When $Fe_2O_3$ and carbon are contained in the auxiliary components, the content of each of the two components is preferably 1% by weight or less, more preferably 0.5% by weight or less, even more preferably 0.1% by weight or less, particularly from the viewpoint of whiteness.

Requirement (II)

In the requirement (II), the weight ratio of $Al_2O_3$ to $SiO_2$ ($Al_2O_3/SiO_2$) or the weight ratio of MgO to $SiO_2$ ($MgO/SiO_2$) is 0.1 to 15, preferably 0.2 to 12, more preferably 0.3 to 9, from the viewpoint of a preferred refractive index of the ceramic particles and of securing preferred optical diffusibility and light transmittance.

[2] Second Embodiment

A second embodiment is an optical diffusible material having a total transparency of 70% or more and an optical diffusible ability of 50% or more, having ceramic particles contained in a base material, wherein the ceramic particles are those obtained by fusing, in a flame, powder particles satisfying the following requirements (III) and (IV):

(III) the total amount of $Al_2O_3$ or MgO and $SiO_2$ is 80% by weight or more; and (IV) the weight ratio of $Al_2O_3$ or MgO to $SiO_2$ (($Al_2O_3$ or $MgO)/SiO_2$) is 0.1 to 17.

Requirement (III)

In the requirement (III), $Al_2O_3$ or MgO and $SiO_2$ are contained in the component, and MgO is preferably contained in the component, from the viewpoint of securing preferred optical diffusibility and light transmittance.

In the requirement (III), also from the same viewpoint, the proportion of $Al_2O_3$ and $SiO_2$ contained or the proportion of MgO and $SiO_2$ contained is 80% by weight or more, preferably 90% by weight or more, even more preferably 95% by weight or more, even more preferably 100% by weight.

Components (also referred to hereinafter as auxiliary components) other than the component composed of $Al_2O_3$ or MgO and $SiO_2$ in the ceramic particles used in the present invention include, for example, metal oxides such as CaO, $Fe_2O_3$, $TiO_2$, $K_2O$, $Na_2O$, $ZrO_2$ etc. and carbon. For conferring excellent optical diffusibility and light transmittance on the optical diffusible material, the whiteness of the ceramic particles is preferably higher, and from such viewpoint, the total amount of the auxiliary components in the ceramic particles is 20% by weight or less, preferably 10% by weight or less, more preferably 5% by weight or less. When $Fe_2O_3$ and carbon are contained in the auxiliary components, the content of each of the two components is preferably 1% by weight or less, more preferably 0.5% by weight or less, even more preferably 0.1% by weight or less, particularly from the viewpoint of whiteness.

Requirement (IV)

In the requirement (IV), the weight ratio of $Al_2O_3$ to $SiO_2$ ($Al_2O_3/SiO_2$) or the weight ratio of MgO to $SiO_2$ ($MgO/SiO_2$) is 0.1 to 17, preferably 0.2 to 15, more preferably 0.3 to 12.

[3] More Preferable Embodiment of the Ceramic Particles

A more preferable embodiment of the ceramic particles used in the first and second embodiments is described.

Average Particle Size

From the viewpoint of securing preferred optical diffusibility and light transmittance and of securing mechanical strength in producing the optical diffusible material by adding the ceramic particles to a base material, the average particle size of the ceramic particles used in the present invention is preferably 100 μm or less, more preferably 50 μm or less, even more preferably 30 μm or less, even more preferably 20 μm or less. From the viewpoint of suppressing aggregation and agglomeration of the particles to prevent a too broad particle-size distribution of the ceramic particles and from the viewpoint of sphericity, the average particle size is preferably 0.01 μm or more, more preferably 0.1 μm or more, even more preferably 1 μm or more, even more preferably 5 μm or more. The average particle size is measured by a method described in the Examples. From the viewpoint of synthesizing the above viewpoints, the average particle size is preferably 0.01 to 100 μm, more preferably 0.01 to 50 μm, even more preferably 0.1 to 50 μm, even more preferably 1 to 20 μm.

Sphericity

From the viewpoint of securing preferred optical diffusibility and light transmission, the sphericity of the ceramic particles used in the present invention is preferably 0.95 or more, more preferably 0.96 or more, even more preferably 0.98 or more. When the sphericity is in this range, the ceramic particles are excellent in dispersibility in a base material and can be added in a larger amount to easily confer the optical property of the optical diffusible material. The sphericity is measured by a method described in the Examples.

Water Absorption

From the viewpoint of suppressing generation of excessive pores (bubbles) in the optical diffusible material to achieve preferred optical diffusibility and light transmittance, pores are preferably fewer in the surfaces of the ceramic particles used in the present invention. The water absorption of the ceramics particles can be an indicator of the degree of pores in the surfaces. That is, pores in the ceramic particles tend to decrease as the water absorption is decreased, and the water absorption is preferably 0.8% by weight or less, more preferably 0.5% by weight or less, even more preferably 0.3% by weight or less. By increasing the average particle size of the ceramic particles, the water absorption can be reduced, and by flame fusion treatment, the water absorption can be further reduced. The water absorption is measured by a method described in the Examples.

Color

The color of the ceramic particles used in the present invention is preferably white from the viewpoint of securing light transmission. The degree of whiteness, expressed in L* value determined by a spectroscopic colorimeter, is preferably 85 or more, more preferably 90 or more, even more preferably 95 or more. Such degree of whiteness can be attained by regulating the amount of auxiliary components in the ceramic particles and their composition, as described in the requirements (I) and (III). The degree of whiteness is measured by a method described in the Examples.

Crystalline Structure

The ceramic particles used in the present invention are a complex compound(s) containing, as the main component, a component composed of $Al_2O_3$ or MgO and $SiO_2$, and its structure can be a noncrystalline structure (amorphous material) or a crystalline structure (crystalline material), and from the viewpoint of excellence in heat resistance, chemical resistance or light resistance and of securing stable optical diffusibility, the ceramic particles are made preferably of a crystalline material. Such high degree of crystallization can be attained by regulating the burning temperature in the range of 1200 to 1850° C. and the burning time in the range of 1 to 5 hours in production of the ceramic particles.

When a mixture of $Al_2O_3$ or MgO and $SiO_2$ in a weight ratio (($Al_2O_3$ or $MgO)/SiO_2$) of 0.3 to 9 is used as the ceramic particles used in the present invention and subjected to high degree of polymerization described above, those ceramic particles whose major peak as determined by X-ray diffraction pattern measurement is a peak attributed to JCPDS (Joint Committee on Powder Diffraction Standards) No. 15-776 Mullite, a peak attributed to JCPDS No. 34-189 Forsterite, or a peak attributed to JCPDS No. 35-610 Clinoenstatite, are preferable from the viewpoint of improving optical diffusibility and light transmittance.

Surface Treatment

The ceramic particles used in the present invention are preferably surface-treated with a silane coupling agent, silicone, fatty acid soap, etc. from the viewpoint of improving dispersibility in a base material.

Specific Gravity

The ceramic particles used in the present invention have a specific gravity of 3.5 to 4, and can, in a smaller amount in a base material, exhibit desired optical properties.

Fluidity

The ceramic particles used in the present invention preferably have suitable fluidity from the viewpoint of improving workability during and after addition of the particles to a base material. Repose angle measured by a powder tester can be an indicator of fluidity, and the repose angle is preferably 55° or less, more preferably 50° or less, even more preferably 48° or less, at which the sphericity of the ceramic particles can be high and the water absorption can be reduced, thereby regulating the fluidity in a preferable range. The repose angle can be measured by a method described in the Examples.

For regulating the repose angle in the range described above, the sphericity of the ceramic particles is preferably 0.95 or more, more preferably 0.96 or more, even more preferably 0.98 or more. For regulating the repose angle in the range described above, the water absorption is preferably 0.8% by weight or less, more preferably 0.5% by weight or less, even more preferably 0.3% by weight or less. By increasing the average particle diameter of the ceramic particles, the water absorption can be reduced, and by flame fusion treatment, the water absorption can be further reduced.

[4] Method of Producing the Ceramic Particles

The ceramic particles of the present invention can be obtained by burning and pulverizing a precursor containing $Al_2O_3$ or MgO and $SiO_2$ produced by a known means such as a mixing method, a precipitation method, a sol-gel method, a spray-pyrolysis method, a hydrothermal method or a CVD method such that the total amount of $Al_2O_3$ or MgO and $SiO_2$ is 80% by weight or more and the $Al_2O_3$ or $MgO/SiO_2$ weight ratio is 0.1 to 15.

As the starting material for forming the precursor, the following starting sources can be used alone or as a mixture of two or more thereof.

The $Al_2O_3$ source can include aluminum oxide, aluminum hydroxide, boehmite, aluminum sulfate, aluminum nitrate, aluminum chloride, alumina sol, aluminium alkoxide such as aluminum isopropoxide, etc.

The $SiO_2$ source can include silica rock, siliceous sand, quartz, cristobalite, amorphous silica, feldspar, pyroferrite, fumed silica, ethyl silicate, silica gel, etc.

The MgO source can include magnesium carbonate, magnesium oxide, magnesium hydroxide, etc.

The (MgO and $SiO_2$) source can include kaolin, bauxite, mica, sillimanite, andalusite, zeolite, montmorillonite, halloysite, etc.

The method of spheroidizing the ceramic particles of the present invention includes a spray-drying method of spray-drying a precursor during formation, an emulsification method of emulsifying, with a surfactant, a precursor during formation, and a flame fusion method of fusing a burned product or a precursor directly in a flame, and from the viewpoint of improving the sphericity to reduce the water absorption, the ceramic particles are made spherical preferably by the flame fusion method.

(1) Composition of the Starting Powder Particles

Powder particles containing at least 80% by weight of $Al_2O_3$ or MgO and $SiO_2$ in a $Al_2O_3/SiO_2$ or $MgO/SiO_2$ weight ratio of 0.1 to 17, preferably having an average particle diameter of 100 μm or less, are used as the starting material. The starting material is preferably MgO.

The content of $Al_2O_3$ or MgO and $SiO_2$ in the powder particles is preferably 85% by weight or more, more preferably 90% by weight or more, even more preferably 100% by weight, and the $Al_2O_3/SiO_2$ or $MgO/SiO_2$ weight ratio is 0.1 to 17, preferably 0.3 to 15, more preferably 0.3 to 12. From the viewpoint of obtaining spherical particles having a narrow particle-size distribution, the $Al_2O_3/SiO_2$ or $MgO/SiO_2$ weight ratio is more preferably 1.5 to 10. For obtaining the desired ceramic particles, the powder particles as the starting material is used after the $Al_2O_3/SiO_2$ or $MgO/SiO_2$ weight ratio is within the range defined above, in consideration of evaporation of the components during fusion.

(2) Average Particle Size and Shape of the Starting Powder Particles

The upper limit of the average particle size of the starting powder particles is preferably 100 μm or less, more preferably 50 μm or less, even more preferably 40 μm or less, even more preferably 30 μm or less, even more preferably 20 μm or less. From the viewpoint of preventing the particle size and sphericity from being in a broad range, the lower limit is preferably 0.01 μm or more, more preferably 0.1 μm or more, even more preferably 1 μm or more, even more preferably 5 μm or more. From the viewpoint of synthesizing the above viewpoints, the average particle size is preferably 0.01 to 100 μm, more preferably 0.01 to 50 μm, even more preferably 0.1 to 40 μm, even more preferably 1 to 30 μm, even more preferably 1 to 20 μm.

From the viewpoint of making the ceramic particles spherical rapidly in a flame and simultaneously obtaining the particles having high sphericity wherein the particle-size distribution is not so broad, the shape of the starting powder particle is preferably selected. From the viewpoint of securing the retention time in a flame and of rapidly fusing and spheroidizing the particles, the starting powder particles have a shape with a major axis/minor axis ratio of preferably 9 or less, more preferably 4 or less, even more preferably 2 or less.

(3) Water Content of the Starting Powder Particles

When the powder particles as the starting material contain water upon fusion, the water will be evaporated, and with evaporation of the water, a large number of pores may be formed in the obtained ceramic particles. Accordingly, the water content (% by weight) of the starting material is preferably 10% by weight or less, more preferably 3% by weight or less, even more preferably 1% by weight or less, from the viewpoint of regulating the water absorption and sphericity of the resulting particles in suitable ranges. The water content can be determined by measuring a loss in the weight of 1 g of powder particles by heating them at 800° C. for 1 hour and calculating the water content from the equation:

$$\{(a \text{ weight before heating} - a \text{ weight after heating})/(a \text{ weight before heating})\} \times 100.$$

(4) Examples of the Starting Powder Particles

In the Case of $Al_2O_3$

The raw material for the source of $Al_2O_3$ includes bauxite, alumina-shale, aluminum oxide, aluminum hydroxide, boehmite, aluminum sulfate, aluminum nitrate, aluminum chloride, alumina sol, aluminium alkoxide such as aluminum isopropoxide, etc.

The raw material for the source of $SiO_2$ includes silica rock, siliceous sand, quartz, cristobalite, amorphous silica, feldspar, pyroferrite, fumed silica, ethyl silicate, silica gel, etc.

The raw material for the source of (Al₂O₃+SiO₂) includes kaolin, alumina-shale, bauxite, mica, sillimanite, andalusite, mullite, zeolite, montmorillonite, halloysite, etc.

These starting materials can be used alone or as a mixture of two or more thereof. The selected starting material is used preferably after calcination for reducing the water content thereof or for facilitating fusion thereof. The calcined starting powder particles can be exemplified by calcined alumina-shale, calcined mullite, calcined bauxite, and a mixture of calcined aluminum hydroxide and kaolin.

In the Case of MgO

The raw material for the source of MgO includes magnesium carbonate, magnesium oxide, magnesium hydroxide, olivine, pyroxene, dunite, serpentine, olivine-based minerals and the like.

The raw material for the source of (MgO+SiO₂) includes forsterite, clinoenstatite, enstatite, olivine, pyroxene, dunite, serpentine, basalt, olivine-based minerals, talc and the like.

These starting materials can be used alone or as a mixture of two or more thereof. The selected starting material is used preferably after calcination for reducing the water content thereof or for facilitating fusion thereof. The calcined starting powder particles can be exemplified by calcined serpentine, calcined olivine, calcined pyroxene, calcined dunite forsterite, calcined enstatite and the like.

(5) Spheroidizing by Flame Fusion Method

In the step of making the starting powder particles spherical, a flame fusion method is used in which the starting powder particles are dispersed in a carrier gas such as oxygen and introduced into a flame thereby being fused and made spherical.

The flame used is generated by burning a fuel such as propane, butane, methane, a natural liquefied gas, LPG, heavy oil, kerosene, gas oil, or powdered charcoal, with oxygen. The flame may be a plasma jet flame generated by ionization of an N₂ inert gas or the like.

The volume ratio of the fuel to oxygen is preferably from 1.01 to 1.3, from the viewpoint of complete combustion. An oxygen gas burner is preferably used from the viewpoint of generating a high-temperature flame. Although the structure of the burner is not particularly limited, burners disclosed in JP-A 7-48118, JP-A 11-132421, JP-A 2000-205523 and JP-A 2000-346318 are preferable.

From the viewpoint of fusion-spheroidizing the starting powder particles, the flame temperature is preferably not lower than the melting point of the starting powder particles. Specifically, the flame temperature is preferably 1700° C. or more, more preferably 2000° C. or more, even more preferably 2600° C. or more.

The powder particles when introduced into a flame are preferably dispersed in a carrier gas. As the carrier gas, oxygen is preferably used. In this case, oxygen for the carrier gas offers an advantage that the oxygen can be consumed for fuel combustion. From the viewpoint of securing the sufficient dispersibility of the powder particles, the density of the powder in the gas is preferably 0.1 to 20 kg/Nm³, more preferably 0.2 to 10 kg/Nm³. In introduction into a flame, it is preferable that the powder particles have been passed through a mesh, a static mixer etc. in order to improve dispersibility.

Optical Diffusible Material

The optical diffusible material in the present invention refers to the one having a total transparency of 70% or more and an optical diffusible ability of 50% or more as determined with a haze meter.

(1) Base Material

The base material used in the present invention is not particularly limited insofar as it is a transparent glass or resin. For example, a photo-curable resin etc. can be used, and examples include polyolefin resin such as polyethylene and polypropylene, polyester resin such as polyethylene terephthalate, cellulose resin such as triacetyl cellulose and butyl cellulose, polystyrene, polyurethane, vinyl chloride, acrylic resin, polycarbonate resin, epoxy resin, phenol resin, silicone resin and polyurethane. Among these, acrylic resin, polycarbonate resin, epoxy resin etc. are preferable from the viewpoint of transparency, light resistance and heat resistance, and acrylic resin is more preferably used.

From the viewpoint of securing the excellent optical diffusibility and light transmittance of the optical diffusible material, the refractive index of the base material is preferably 1.31 to 1.63, more preferably 1.40 to 1.61, even more preferably 1.48 to 1.60.

From the viewpoint of securing the excellent optical diffusibility and light transmittance of the optical diffusible material, the base material and the ceramic particles are combined desirably such that the difference between the refractive index of the base material and the refractive index of the ceramic particles is preferably 0.01 to 0.3, more preferably 0.03 to 0.2, even more preferably 0.05 to 0.15.

Preferable combinations of the base material and the ceramic particles are shown in Table 1.

TABLE 1

| Base Material Resin | | Ceramic Particles | |
|---|---|---|---|
| | Refractive Index | A 1.64 | B 1.63 |
| Fluorine | 1.35 | 0.29 | 0.28 | Difference in |
| Silicone | 1.48 | 0.16 | 0.15 | diffractive |
| Polyvinyl alcohol | 1.51 | 0.13 | 0.12 | index between the base |
| Polyamide | 1.53 | 0.11 | 0.10 | material and |
| Epoxy | 1.61 | 0.03 | 0.02 | the particles |
| Cellulose | 1.5 | 0.14 | 0.13 | |
| Polystyrene | 1.6 | 0.04 | 0.03 | |
| Vinyl chloride | 1.54 | 0.10 | 0.09 | |
| Polyethylene | 1.51 | 0.13 | 0.12 | |
| Polypropylene | 1.51 | 0.13 | 0.12 | |
| Polycarbonate | 1.59 | 0.05 | 0.04 | |
| Polyester | 1.59 | 0.05 | 0.04 | |
| Acryl | 1.49 | 0.15 | 0.14 | |

Ceramic Particles A: Total amount of Al₂O₃ and SiO₂ = 99% by weight Al₂O₃/SiO₂ weight ratio = 2.6
Ceramic Particles B: Total amount of MgO and SiO₂ = 99% by weight MgO/SiO₂ weight ratio = 1.3

(2) Production Conditions

The optical diffusible material of the present invention can be obtained in the form of a sheet for example under the following conditions:

(a) a method of kneading ceramic particles into a base material with a kneader;
(b) a method of mixing ceramic particles in a solution, emulsion, dispersion or suspension of a base-material resin and forming the mixture into a sheet;
(c) a method of coating the surface of a base-material sheet with binder-containing ceramic particles; and
(d) a method of adding ceramic particles to monomers of a base-material resin and polymerizing the monomers in a step of synthesizing a base-material resin.

Among these methods, the method of kneading ceramic particles into a base material with a kneader to form the mixture into a sheet is preferable. As the kneader, known kneaders such as a mixing mill, a twin-screw kneader, a kneader, an internal mixer and an extruder can be used. As the molding machine, a roll forming machine, an injection molding machine, an extrusion molding machine and a hot press molding machine can be used.

With respect to the content of the ceramic particles in the base material from the viewpoint of securing the excellent optical diffusibility and light transmittance of the optical diffusible material, the amount of the ceramic particles added to 100 parts by weight of the base material is preferably 0.1 part by weight or more, more preferably 0.5 part by weight, even more preferably 1 part by weight or more, particularly form the viewpoint of securing the excellent optical diffusibility, or is preferably 1000 parts by weight or less, more preferably 100 parts by weight or less, even more preferably 30 parts by weight or less, even more preferably 10 parts by weight or less, particularly from the viewpoint of securing the light transmittance. From the viewpoint of synthesizing the above viewpoints, the amount of the ceramic particles added to 100 parts by weight of the base material is preferably 0.1 to 1000 parts by weight, more preferably 0.1 to 100 parts by weight, even more preferably 0.1 to 30 parts by weight, even more preferably 0.5 to 30 parts by weight, even more preferably 1 to 10 parts by weight.

From the viewpoint of securing the excellent optical diffusibility and transparency of the optical diffusible material, the thickness of the optical diffusible material formed into a sheet is preferably 0.05 μm or more, more preferably 1 μm or more, even more preferably 10 μm or more, particularly from the viewpoint of securing the excellent optical diffusibility, or is preferably 20 mm or less, more preferably 2 mm or less, even more preferably 1 mm or less, from the viewpoint of securing the excellent light transmittance, and from the viewpoint of synthesizing the above viewpoints, the thickness of the optical diffusible material is preferably 0.05 μm to 20 mm, more preferably 1 μm to 2 mm, even more preferably 10 μm to 1 mm.

If necessary, a release agent, a heat stabilizer, a UV absorber, a coloring agent, a fluorescent material, a luminescent material, a reinforcing agent and the like can be added to the optical diffusible material of the present invention to such an extent that the optical diffusibility and light transmittance are not impaired.

(3) Use

The shape of the optical diffusible material of the present invention is not particularly limited due to its use etc., and for example, the optical diffusible material is used preferably in a liquid crystal display, a transmissive or reflective screen, a lighting cover, an illuminated sign, a Fresnel lens for projector, and a light-emitting diode.

EXAMPLES

The present invention is illustrated by reference to the following examples. The Examples are set forth for mere illustration of the present invention and not intended to limit the present invention.

<<Measurement Methods>>

(1) Composition

The respective atoms Al, Mg and Si in a composition are quantified by elementary analysis using a fluorescent X-ray method (JIS R2216 "Method for Fluorescent X-Ray Analysis of Fire Brick and Fire Mortar"). From a diffraction pattern in X-ray diffraction measurement, the presence of $Al_2O_3$, MgO, $SiO_2$ or a complex compound thereof is confirmed. When no diffraction pattern is obtained, the presence of $Al_2O_3$, MgO and $SiO_2$ is confirmed by measurement using Raman spectroscopy, IR, NMR etc. From the results, the total amount of $Al_2O_3$ or MgO and $SiO_2$, and the weight ratio of $Al_2O_3$ or MgO to $SiO_2$ (($Al_2O_3$ or MgO)/$SiO_2$), are calculated.

(2) Average Particle Size

The average particle size refers to D50 (medium particle size, that is the size of 50% particles based on volume) is measured by a laser diffraction/scattering method with LA-920 (Horiba, Ltd.).

(3) Sphericity

The sphericity is determined by measuring the area of a projected section of the ceramic particle and the peripheral length of the section in an SEM image obtained with a real-surface view microscope VF-7800 (manufactured by Keyence Corporation), then calculating [peripheral length of a complete round having the same area as the area of the projected section of the particle]/[peripheral length of the projected section of the particle], and averaging respectively obtained values selected from arbitrary 50 particles.

(4) Water Absorption

The water absorption is measured according to a method for determining the water absorption of fine aggregate as prescribed in JIS A1109.

(5) Repose Angle

The repose angle is measured according to JIS R9301-2-2. TYPEPT-E manufactured by Hosokawa Micron Corporation is used as a powder tester used in measurement of repose angle.

(6) Refractive Index

The refractive index of the ceramic particles and the base-material resin is determined by the B method (Immersion Liquid Method Using Microscope (Becke line method)) in JIS K7142 "Method for Measurement of Refractive Index of Plastics", provided that in place of the immersion liquid used in JIS K7142, a liquid shown in Table 2 is used as the immersion liquid, and the refractive index is measured under the condition of an immersion-liquid temperature of 15 to 20° C. As a microscope, a polarization microscope "Optiphoto" (manufactured by Nikon Corporation) is used.

TABLE 2

| Immersion Liquid | Refractive Index (15 to 20° C.) |
| --- | --- |
| Clove oil | 1.530 |
| Cassia oil | 1.602 |
| 1 Monochlorna phthalene | 1.636 |
| 2 Monobrom naphthalene | 1.622 |
| Methylene iodide | 1.741 |

(7) Total Transparency and Optical Diffusible Ability

Parallel light transmittance (Tp) and scattered light transmittance (Td) are measured with a haze meter (type HR-100 manufactured by Murakami Color Research Laboratory), to calculate the total transparency (Tp+Td), and then optical diffusible ability [=(Td/(Tp+Td))×100] is determined. A sample of higher total transparency is evaluated as having higher light permeability, and a sample of higher optical diffusible ability is evaluated as having higher optical diffusibility.

(8) Light Resistance Test (Accelerated Light Resistance Test Method)

Two materials to be compared with each other are set in a Sunshine Super-Long Life Weather Meter (manufactured by Suga Test Instrument Co., Ltd.) and irradiated with a carbon arc light. The sample before and after irradiation is measured for its yellowness ($b^*$) by a spectroscopic colorimeter (SE-2000) (manufactured by Nippon Denshoku Industries Co., Ltd.), and the degree of yellowness of the sample before and after irradiation is compared as shown by the following equation:

$$\Delta b^* = b^* \text{ after light irradiation} - b^* \text{ before light irradiation}$$

Production Example 1

Alumina (purity 99.9%) and silica (purity 99.9%) were wet-mixed in ethanol such that the $Al_2O_3/SiO_2$ weight ratio was 2.6, and then vacuum-dried to give powder which was then burned at 1500° C. for 3 hours and dry-pulverized to give ceramic particles 1.
(2) The Properties Shown in Table 3 were Obtained for the Ceramic Particles 1.

Production Example 2

(1) Starting Powder Particles
The ceramic particles 1 were used as starting powder particles.
(2) Spheroidizing Conditions
The powder particles were introduced with oxygen as carrier gas into a flame (about 2000° C.) in LPG (propane gas) burning at a ratio of 1.1 to oxygen (volume ratio) to give ceramic particles 2.
(3) The Properties Shown in Table 3 were Obtained for the Ceramic Particles 2.

Production Example 3

(1) Conditions of Production of Ceramic Particles 3
An aqueous solution of aluminum sulfate (0.7 mol/L) was mixed with fumed silica such that the $Al_2O_3/SiO_2$ weight ratio was 2.6. The mixture was dried at 120° C., then burned at 1400° C. for 3 hours, and wet-pulverized to give ceramic particles 3.
(2) The Properties Shown in Table 3 were Obtained for the Ceramic Particles 3.

Production Example 4

(1) Starting Powder Particles
The ceramic particles 1 were classified, and those having an average particle diameter of 3 μm were used as starting powder particles.
(2) Spheroidizing Conditions
Ceramic particles 4 were obtained in the same manner as in Production Example 2.
(3) The Properties Shown in Table 3 were Obtained for the Ceramic Particles 4.

Production Example 5

(1) Conditions of Production of Ceramic Particles 5
24 ml of a surfactant (EMULGEN 108 from Kao Corporation) was added to a stirred and mixed liquid of 2400 ml n-butanol and 2600 ml carbon tetrachloride. 200 ml of a mixture of 10 wt % alumina sol and colloidal silica in a $Al_2O_3/SiO_2$ weight ratio of 2.6 was added dropwise thereto to give spherical gel. This gel was filtered and dried at 60° C. to give powder which was then burned at 1200° C. for 1 hour.
(2) The Properties Shown in Table 3 were Obtained for the Ceramic Particles 5.

Production Example 6

(1) Conditions for Production of Ceramic Particles 6
Alumina sol and colloidal silica were mixed such that the $Al_2O_3/SiO_2$ weight ratio was 2.6, and then subjected to ultrasonic spray drying at 300° C. The resulting powder was burned at 1000° C. for 3 hours.
(2) The Properties Shown in Table 3 were Obtained for the Ceramic Particles 6.

Production Example 7

(1) Conditions for Production of Ceramic Particles 7
Ethyl silicate ($Si(OC_2H_5)_4$) was mixed at a final concentration of 4 moles/L with a mixture of ethanol/water/hydrochloric acid (molar ratio 5:1:0.01) and then stirred at room temperature for 24 hours. Magnesia (purity 99.9%) was added thereto such that the $MgO/SiO_2$ weight ratio was 1.3, and the mixture was stirred at room temperature for 24 hours. The resulting gel was vacuum-dried at 80° C., burned at 1200° C. for 3 hours and dry-pulverized to give ceramic particles 7.
(2) The Properties Shown in Table 3 were Obtained for the Ceramic Particles 7.

Production Example 8

(1) Starting Powder Particles and Spheroidizing Conditions
The ceramic particles 7 were used as starting powder particles to give ceramic particles 8 in the same manner as in Production Example 2.
(2) The Properties Shown in Table 3 were Obtained for the Ceramic Particles 8.

Production Example 9

(1) Starting Powder Particles and Spheroidizing Conditions
The ceramic particles 7 were wet-dried to give ceramic particles 9.
(2) The Properties Shown in Table 3 were Obtained for the Ceramic Particles 9.

Production Example 10

(1) Starting Powder Particles and Spheroidizing Conditions
The ceramic particles 9 were used as starting powder particles to give ceramic particles 10 in the same manner as in Production Example 2.
(2) The Properties Shown in Table 3 were Obtained for the Ceramic Particles 10.

Example 1

100 parts by weight of the ceramic particles 1 were added and surface-treated with 1 part by weight of aminopropyltriethoxysilane. 1 part by weight of the surface-treated ceramic particles 1 was mixed with 100 parts by weight of acrylic pellets, and then mixed in a roll kneader (manufactured by NISHIMURA MFG. Co., Ltd.) at 185° C. and pressed with a pressing machine (manufactured by Toyo Seiki Co., Ltd.) to prepare an optical diffusible material 1 of 1 mm in thickness.

Examples 2 to 9

Optical diffusible materials 2 to 10 were prepared under the same conditions as in Example 1 except that in place of the ceramic particles 1, the ceramics 2 to 10 were used.

Comparative Example 1

A comparative material 1 was prepared under the same conditions as in Example 1 except that commercial spherical silica powder having the properties in Table 3 was used.

Comparative Example 2

A comparative material 2 was prepared under the same conditions as in Example 1 except that commercial amorphous silica powder having the properties in Table 3 was used.

Comparative Example 3

A comparative material 3 was prepared under the same conditions as in Example 1 except that commercial spherical alumina powder having the properties in Table 3 was used.

TABLE 3

| | | Properties of ceramic particles | | | | | | |
|---|---|---|---|---|---|---|---|---|
| | | Major component | Spheroidizing method | Sphericity | Total amount of AL2O3 or MgO and SiO2 | ($Al_2O_3$ or MgO)/ $SiO_2$ | Average particle size μm | Refractive index |
| Example 1 | Ceramic particle 1 | $Al_2O_3$ and $SiO_2$ | None | 0.80 | 99 | 2.6 | 12 | 1.64 |
| Example 2 | Ceramic particle 2 | $Al_2O_3$ and $SiO_2$ | Flame fusion method | 0.96 | 99 | 2.6 | 11 | 1.64 |
| Example 3 | Ceramic particle 3 | $Al_2O_3$ and $SiO_2$ | None | 0.81 | 99 | 2.6 | 2 | 1.64 |
| Example 4 | Ceramic particle 4 | $Al_2O_3$ and $SiO_2$ | Flame fusion method | 0.96 | 99 | 2.6 | 3 | 1.64 |
| Example 5 | Ceramic particle 5 | $Al_2O_3$ and $SiO_2$ | Sol-gel method | 0.92 | 98 | 2.6 | 12 | 1.64 |
| Example 6 | Ceramic particle 6 | $Al_2O_3$ and $SiO_2$ | Spray-drying method | 0.92 | 99 | 2.6 | 2 | 1.64 |
| Example 7 | Ceramic particle 7 | MgO and $SiO_2$ | None | 0.81 | 99 | 1.3 | 12 | 1.63 |
| Example 8 | Ceramic particle 8 | MgO and $SiO_2$ | Flame fusion method | 0.98 | 99 | 1.3 | 12 | 1.63 |
| Example 9 | Ceramic particle 9 | MgO and $SiO_2$ | None | 0.82 | 98 | 1.3 | 5 | 1.63 |
| Example 10 | Ceramic particle 10 | MgO and $SiO_2$ | Flame fusion method | 0.97 | 98 | 1.3 | 6 | 1.63 |
| Comparative example 1 | Commercial spherical silica powder | $SiO_2$ | Commercial product | 0.84 | | | 14 | 1.55 |
| Comparative example 2 | Commercial amorphous silica powder | $SiO_2$ | Commercial product | 0.80 | | | 14 | 1.55 |
| Comparative example 3 | Commercial spherical silica powder | $Al_2O_3$ | Commercial product | 0.90 | | | 23 | 1.75 |

| | Properties of ceramic particles | | | | Properties of optical diffusible material | | |
|---|---|---|---|---|---|---|---|
| | Water absorption wt % | Specific gravity | Repose angle | | Amount of added particles parts by weight | Total transparency % | Optical diffusible ability % |
| Example 1 | 1.2 | 3.2 | 67 | Optical diffusible material 1 | 1 | 81 | 80 |
| Example 2 | 0.6 | 3.2 | 48 | Optical diffusible material 2 | 1 | 85 | 80 |
| Example 3 | 1.5 | 3.2 | 58 | Optical diffusible material 3 | 1 | 70 | 85 |
| Example 4 | 0.7 | 3.2 | 48 | Optical diffusible material 4 | 1 | 83 | 87 |
| Example 5 | 1.8 | 3.2 | 49 | Optical diffusible material 5 | 1 | 78 | 55 |

TABLE 3-continued

| | | | | | | | |
|---|---|---|---|---|---|---|---|
| Example 6 | 2 | 3.2 | 50 | Optical diffusible material 6 | 1 | 70 | 65 |
| Example 7 | 1.2 | 3.2 | 73 | Optical diffusible material 7 | 1 | 82 | 82 |
| Example 8 | 0.5 | 3.2 | 44 | Optical diffusible material 8 | 1 | 85 | 85 |
| Example 9 | 1.3 | 3.2 | 53 | Optical diffusible material 9 | 1 | 74 | 89 |
| Example 10 | 0.6 | 3.2 | 47 | Optical diffusible material 10 | 1 | 85 | 90 |
| Comparative example 1 | 0.4 | 2.7 | 52 | Comparative material 1 | 1 | 90 | 31 |
| Comparative example 2 | 0.9 | 2.7 | 55 | Comparative material 2 | 1 | 88 | 29 |
| Comparative example 3 | 0.2 | 3.9 | 50 | Comparative material 3 | 1 | 88 | 20 |

As is evident from Table 3, it can be seen that the optical diffusible materials of the present invention have a total transparency of higher than 70% and particularly have optical diffusible ability higher than that of a sheet produced by adding the conventional commercial ceramic particles, and the optical diffusible materials produced by adding ceramic particles by the flame fusion method have higher optical diffusible ability.

Example 11

An optical diffusible material 11 of 1 mm in thickness was produced under the same conditions as in Example 1 except that 2 parts by weight of the ceramic particles 4 in Production Example 4 were mixed with 100 parts by weight of acrylic pellets.

Comparative Example 4

A comparative material 4 of 1 mm in thickness was produced under the same conditions as in Example 1 except that in Example 11, 2 parts by weight of crosslinked polystyrene (average particle size 6 sphericity 0.95, refractive index 1.59) was added in place of the ceramic particles 4 in Production Example 4.

Figure 1:
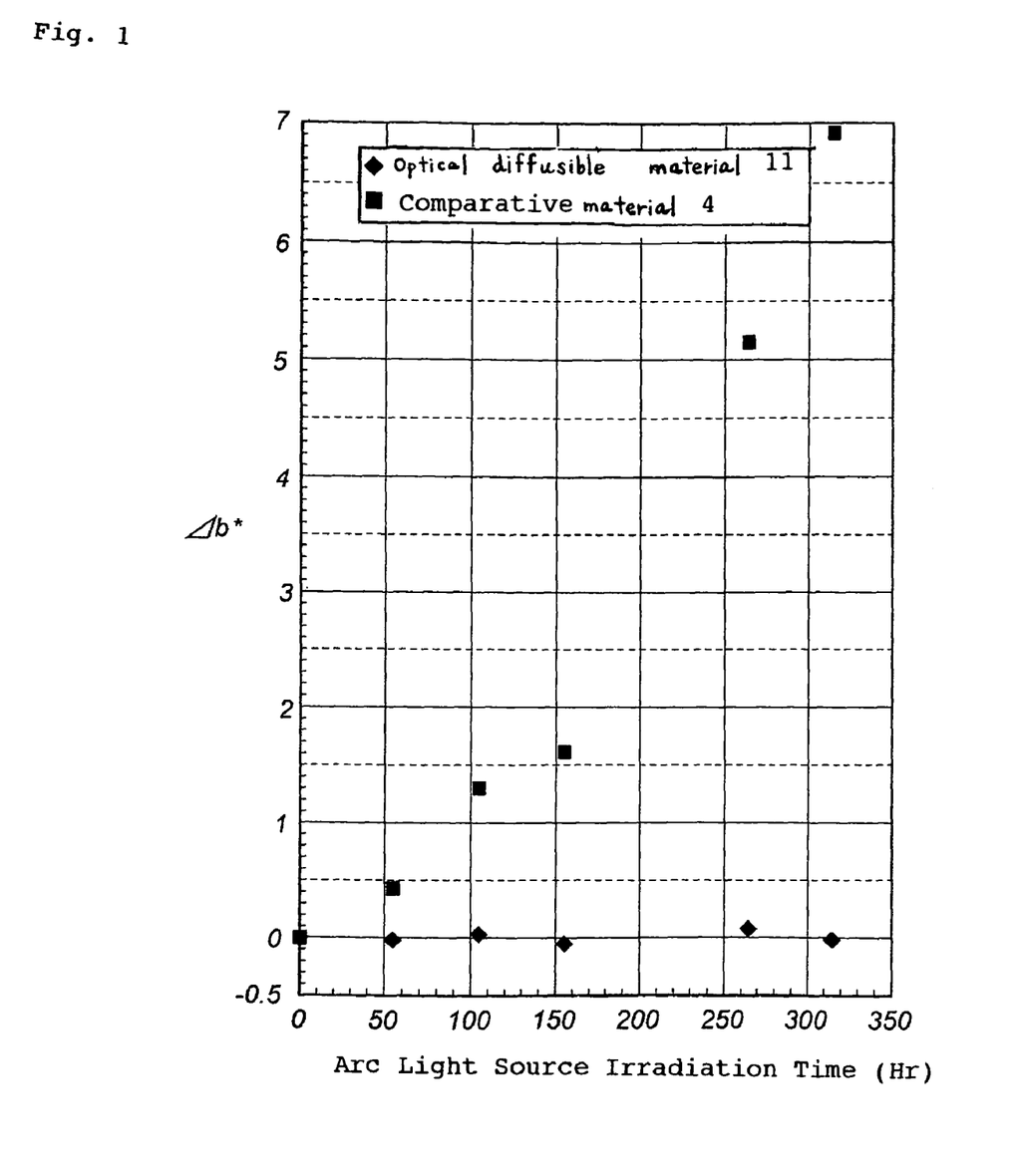
FIG. 1 is a graph showing results of an accelerated light-resistance test using an optical diffusible material 11 and a comparative material 4.

As is evident from Table 4 and FIG. 1, yellowing of the optical diffusible material 11 of the present invention is not observed, but the comparative material 4 is yellowed with light irradiation time, in the accelerated light resistance test.

The invention claimed is:

1. An optical diffusible material having a total transparency of 70% or more and an optical diffusible ability of 50% or more, comprising ceramic particles contained in a base material, the ceramic particles satisfying the following requirements (I) and (II):
   (I) the total amount of ($Al_2O_3$ or MgO) and $SiO_2$ is 95% by weight or more; and
   (II) the weight ratio of ($Al_2O_3$ or MgO) to $SiO_2$ (($Al_2O_3$ or MgO)/$SiO_2$) is 0.3 to 9;
   wherein the base material is a resin;
   wherein the ceramic particles are contained in an amount of 0.5 to 10 parts by weight based on 100 parts by weight of the base material;
   wherein the ceramic particles are produced by a flame fusion method with a flame temperature of 2000° C. or more; and
   wherein the water absorption of the ceramic particles is 0.8% by weight or less.

TABLE 4

| | | Example 11 | Comparative example 4 |
|---|---|---|---|
| | | Ceramic particles 4 | Crosslinked polystyrene |
| Properties of ceramic particles | Average particle size μm | 3 | 6 |
| | Sphericity | 0.96 | 0.95 |
| | Refractive index | 1.63 | 1.59 |
| | | optical diffusible material 11 | Comparative material 4 |
| Properties of optical diffusible material | Total transparency % | 76 | 71 |
| | optical diffusible ability % | 89 | 89 |
| Light resistance test   Initial value | b* of the sample before light irradiation | 2.6 | 0.61 |
| Δb* | 54 hours after light irradiation | −0.01 | 0.43 |
| | 104 hours after light irradiation | 0.03 | 1.31 |
| | 154 hours after light irradiation | −0.05 | 1.62 |
| | 264 hours after light irradiation | 0.08 | 5.15 |
| | 314 hours after light irradiation | −0.01 | 6.92 |

2. An optical diffusible material having a total transparency of 70% or more and an optical diffusible ability of 50% or more, comprising ceramic particles contained in a base material, the ceramic particles being obtained by fusing, in a flame with a flame temperature of 2000° C. or more, powder particles satisfying the following requirements (III) and (IV):
- (III) the total amount of ($Al_2O_3$ or MgO) and $SiO_2$ is 95% by weight or more; and
- (IV) the weight ratio of ($Al_2O_3$ or MgO) to $SiO_2$ (($Al_2O_3$ or MgO)/$SiO_2$) is 0.3 to 12;
- wherein the base material is a resin;
- wherein the ceramic particles are contained in an amount of 0.5 to 10 parts by weight based on 100 parts by weight of the base material; and
- wherein the water absorption of the ceramic particles is 0.8% by weight or less.

3. The optical diffusible material according to claim 1 or 2, wherein the average particle size of the ceramic particles is 1 to 20 μm.

4. The optical diffusible material according to claim 1, wherein the sphericity of the ceramic particles is 0.96 or more.

5. A method of producing the optical diffusible material of claim 1 by any of the following methods (a) to (d):
- (a) a method of kneading ceramic particles into a base material with a kneader;
- (b) a method of mixing ceramic particles in a solution, emulsion, dispersion or suspension of a base-material resin and forming the mixture into a sheet;
- (c) a method of coating the surface of a base-material sheet with binder-containing ceramic particles; and
- (d) a method of adding ceramic particles to monomers of a base-material resin and polymerizing the monomers, in a step of synthesizing a base-material resin.

6. The optical diffusible material according to claim 1, wherein the resin has a refractive index of 1.48 to 1.61, wherein the difference in the refractive index between the base material and the ceramic particles is 0.01 to 0.3.

7. The optical diffusible material according to claim 2, wherein the resin has a refractive index of 1.48 to 1.61, wherein the difference in the refractive index between the base material and the ceramic particles is 0.01 to 0.3.

8. The optical diffusible material according to claim 1, wherein the total amount of ($Al_2O_3$ or MgO) and $SiO_2$ is 98% by weight or more.

9. The optical diffusible material according to claim 1, wherein the water absorption of the ceramic particles is 0.7% by weight or less.

10. The optical diffusible material according to claim 2, wherein the water absorption of the ceramic particles is 0.7% by weight or less.

11. The optical diffusible material according to claim 1, wherein the optical diffusible material has a total transparency of 83% or more.

12. The optical diffusible material according to claim 2, wherein the optical diffusible material has a total transparency of 83% or more.

13. The optical diffusible material according to claim 1, wherein the optical diffusible material has an optical diffusible ability of 80% or more.

14. The optical diffusible material according to claim 2, wherein the optical diffusible material has an optical diffusible ability of 80% or more.

15. The optical diffusible material according to claim 1, wherein the ceramic particles have a repose angle of 48° or less.

16. The optical diffusible material according to claim 2, wherein the ceramic particles have a repose angle of 48° or less.

* * * * *